US007429982B2

(12) United States Patent
You et al.

(10) Patent No.: US 7,429,982 B2
(45) Date of Patent: Sep. 30, 2008

(54) DIGITAL LIGHTING CONTROL SYSTEM

(75) Inventors: Ju-Yuan You, Hsinchu (TW); Ching-Hui Chen, Hsinchu (TW); Chien-Feng Chang, Hsinchu (TW); Chien-Liang Yeh, Hsinchu (TW)

(73) Assignee: OPTO Tech Corp., Hsinchu (TW)

( * ) Notice: Subject to any disclaimer, the term of this patent is extended or adjusted under 35 U.S.C. 154(b) by 214 days.

(21) Appl. No.: 11/381,747

(22) Filed: May 5, 2006

(65) Prior Publication Data

US 2007/0258523 A1 Nov. 8, 2007

(51) Int. Cl.
*G06F 3/038* (2006.01)

(52) U.S. Cl. .................... 345/204; 315/294; 340/815.45

(58) Field of Classification Search .............. 340/815.4, 340/815.45; 315/294; 345/30, 46, 589, 600, 345/619, 204, 82, 83; 375/240.26
See application file for complete search history.

(56) References Cited

U.S. PATENT DOCUMENTS 6,166,496 A * 12/2000 Lys et al. .................... 315/316
7,075,992 B2 * 7/2006 Chen et al. .................. 345/204
2005/0007038 A1 1/2005 Chen et al. .................. 315/294
2006/0214878 A1 * 9/2006 Yu et al. ........................ 345/46

* cited by examiner

*Primary Examiner*—Thomas J Mullen, Jr.

(57) ABSTRACT

A digital lighting control system for controlling a plurality of lighting elements is provided, including a PC, a signal control unit, a signal conversion unit, and a signal dispatching unit. The signal control unit has a video signal input decoder for receiving video signal input and a PC display interface for connecting to the PC. The PC can control the lighting elements through the addresses of the lighting elements stored in the signal control unit. The signal conversion unit is connected to the signal control unit to receive control signals. The received control data is converted into data including addressing and control codes of the lighting elements. The signal dispatching unit is connected to the signal conversion unit for receiving converted addressing and control codes of the lighting elements. The signal dispatching unit dispatches the address and control code to lighting elements, which are connected to the signal dispatching unit. In addition, a plurality of signal control units can be serially connected to a PC, a plurality of signal conversion units can be serially connected to a signal control unit, and a plurality of signal dispatching units can be serially connected to a signal conversion unit. Therefore, a large area or various combinations of lighting elements can be controlled by the digital lighting control system.

10 Claims, 4 Drawing Sheets

DIGITAL LIGHTING CONTROL SYSTEM

FIELD OF THE INVENTION

The present invention generally relates to a lighting system, and more specifically to a digital lighting control system.

BACKGROUND OF THE INVENTION

In recent years, light-emitting diode (LED) arrays are widely used in many devices or equipment, such as light source of a printer or a scanner. In addition, various types of LED array displays are developed and used on numerous occasions, including traffic signs, and outdoor commercial display. The conventional control system for LED lighting system uses a DMX-512 interface, which is a standard protocol the lighting control desks use to communicate with the lighting equipment. The DMX-512 protocol is widely used in theater and stage lighting. However, DMX-512 imposes severe application restrictions. For example, DMX-512 is defined as an unreliable data transmission system; therefore, it must not be used with a system that may trigger any forms of error correction, such as pyrotechnics.

Various digital control systems are developed for LED lighting systems. For example, U.S. patent application Ser. No. 2005/0,007,038 disclosed a digital lighting system controller with video input capacity, which can be used with standard DMX-512 interface and regularly or irregularly arranged lighting system without pre-defined addresses.

SUMMARY OF THE INVENTION

The primary object of the present invention is to provide a digital lighting control system for controlling a plurality of lighting elements. Each light element can be a single light source or a light array.

Another object of the present invention is to provide an extensible digital lighting control system. By connecting a plurality of the digital lighting control systems of the present invention, the extended lighting control system can control a large area or various combinations of lighting elements.

To achieve the aforementioned objects, the present invention provides a digital lighting control system for controlling a plurality of lighting elements, including a PC, a signal control unit, a signal conversion unit, and a signal dispatching unit. The signal control unit has a video signal input decoder for receiving video signal input and a PC display interface for connecting to the PC. The PC can control the lighting elements through the addresses of the lighting elements stored in the signal control unit. The signal conversion unit is connected to the signal control unit to receive control signals. The received control data is converted into data including addressing and control codes of the lighting elements. The signal dispatching unit is connected to the signal conversion unit for receiving converted address and control codes of the lighting elements. The signal dispatching unit dispatches the address and control code to lighting elements, which are connected to the signal dispatching unit. In addition, a plurality of signal control units can be serially connected to a PC, a plurality of signal conversion units can be serially connected to a signal control unit, and a plurality of signal dispatching units can be serially connected to a signal conversion unit. Therefore, a large area or various combinations of lighting elements can be controlled by the digital lighting control system.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
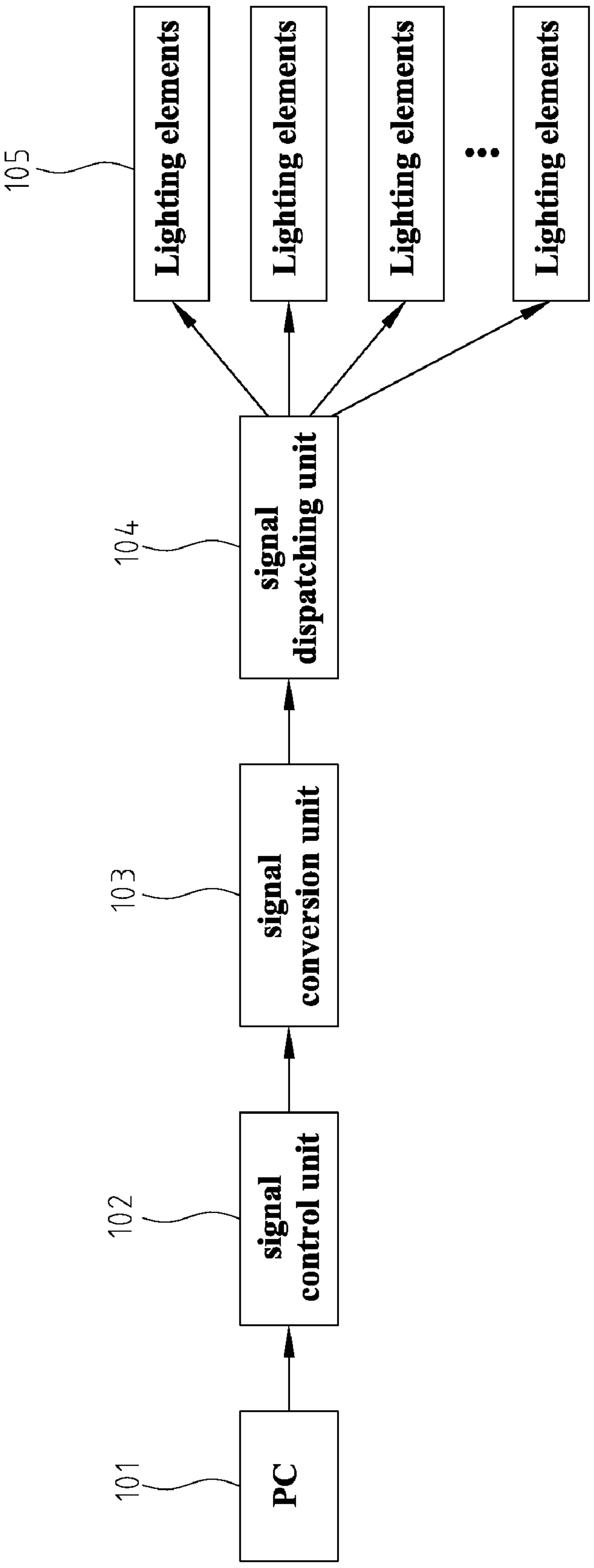
FIG. 1 shows a schematic view of the digital lighting control system according to the invention.

FIG. 1 shows a schematic view of the digital lighting control system of the present invention. A digital lighting control system 100 of the present invention includes a PC 101, a signal control unit 102, a signal conversion unit 103, a signal dispatching unit 104, and a plurality of lighting elements 105. Signal control unit 102 has a video signal input decoder for receiving video signal input and a PC display interface for connecting to PC 101. PC 101 can control the lighting elements through the addresses of the lighting elements stored in signal control unit 102. Signal conversion unit 103 is connected to signal control unit 102 to receive control signals. The received control data is converted into data including addressing and control codes of lighting elements 105. Signal dispatching unit 104 is connected to signal conversion unit 103 for receiving converted addressing and control codes of lighting elements 105. Signal dispatching unit 104 dispatches the address and control code to lighting elements 105, which are connected to signal dispatching unit 104.

Figure 2:
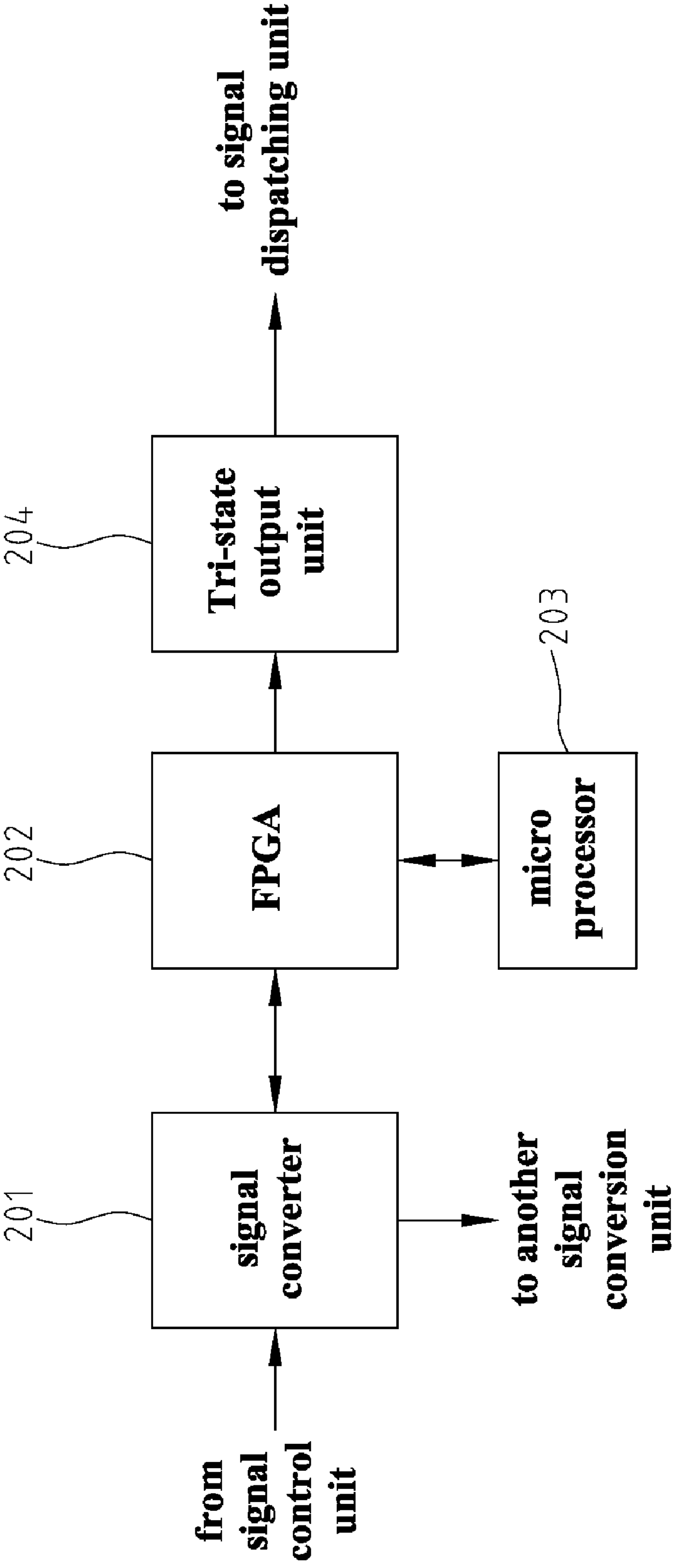
FIG. 2 shows a schematic view of an embodiment of the signal conversion unit of the present invention.

FIG. 2 shows a schematic view of an embodiment of the signal conversion unit of the present invention. Signal conversion unit 102 includes a signal converter 201, an FPGA 202, a microprocessor 203 and a tri-state output unit 204. Signal converter 201 receives control signals from signal control unit 102 of FIG. 1, and tri-state output unit outputs addressing and control codes to signal dispatching unit 104 of FIG. 1 for dispatching to lighting elements 105. Signal converter 201 is for converting signals into a different format. For example, signal converter 201 can be used for converting RS-422 signals, such as latch, clock, and data, to TTL signals, or from TTL signals to RS-422 signals. FPGA 202 is connected to signal converter 201 to receive and process the converted signals into a plurality of addressing and control codes for the lighting elements. Microprocessor 203 is connected to FPGA 202 to provide human-machine interface, data transmission and display so that the input information, such as addresses, size, RGB calibration factor of the lighting elements, can be used with signals received by FPGA 202. Tri-state output unit 204 is connected to FPGA 202 for receiving and relaying addressing and control codes of lighting elements. Tri-state output unit 204 can be implemented with a plurality of 16-bit transceivers. In this embodiment, each conversion unit includes two 16-bit transceivers, with each transceiver outputting four sets of TTL outputs. Therefore, this embodiment outputs 8 sets of TTL outputs.

Figure 3:
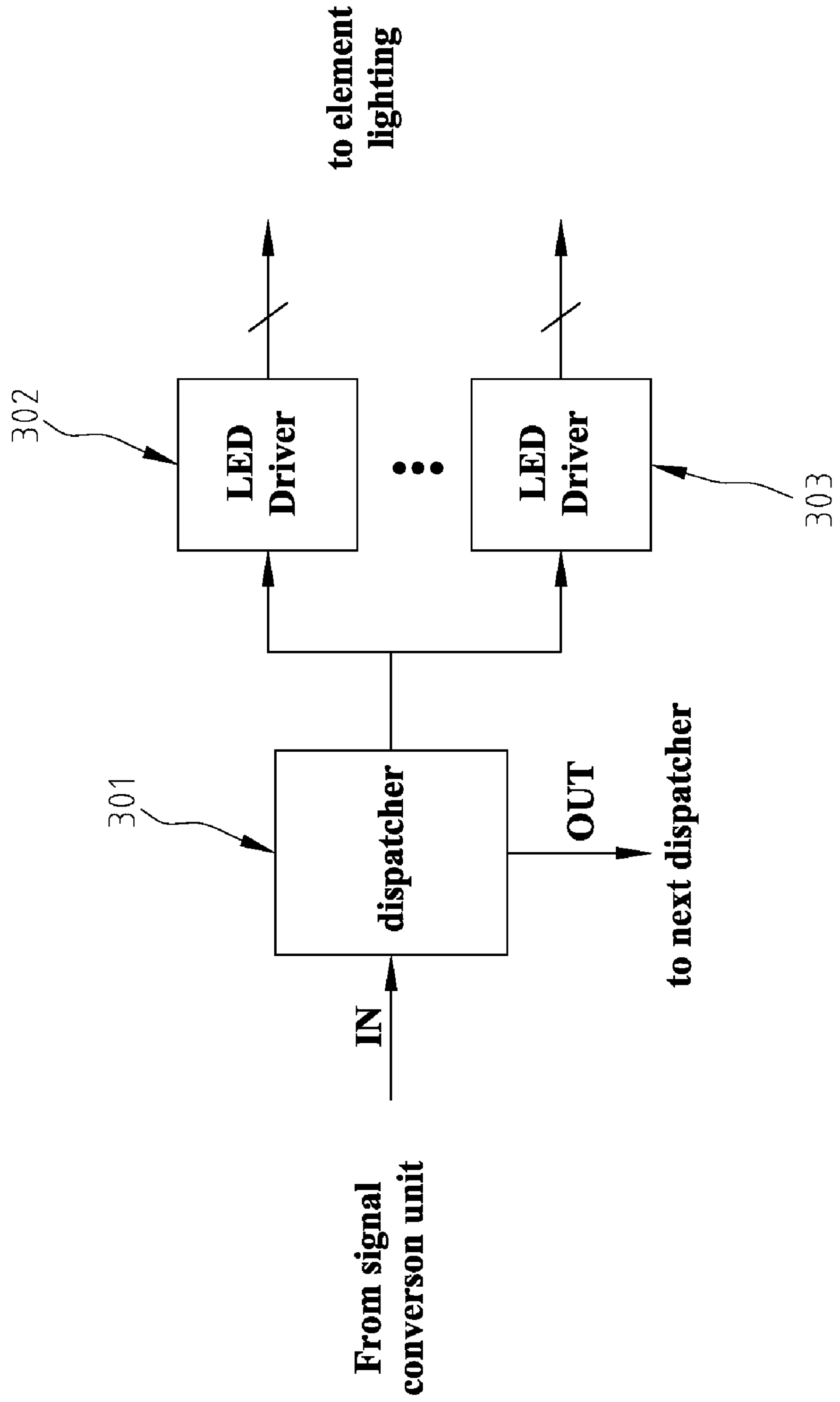
FIG. 3 shows a schematic view of an embodiment of the signal dispatching unit of the present invention.

FIG. 3 shows a schematic view of an embodiment of a signal dispatching unit of the present invention. A signal dispatching unit 104 of the present invention includes a dispatcher 301 and a plurality of LED drivers 302. Dispatcher 301 is connected to tri-state output unit 204 of signal conversion unit 103 for receiving and dispatching addressing and control codes of lighting elements to LED drivers 302. LED drivers 302 are connected to dispatcher 301 to receive the addressing and control codes from dispatcher 301 and drives lighting elements 105. LED drivers 302 translate the serial addressing and control codes to control the luminance and brightness of lighting elements 105.

Figure 4:
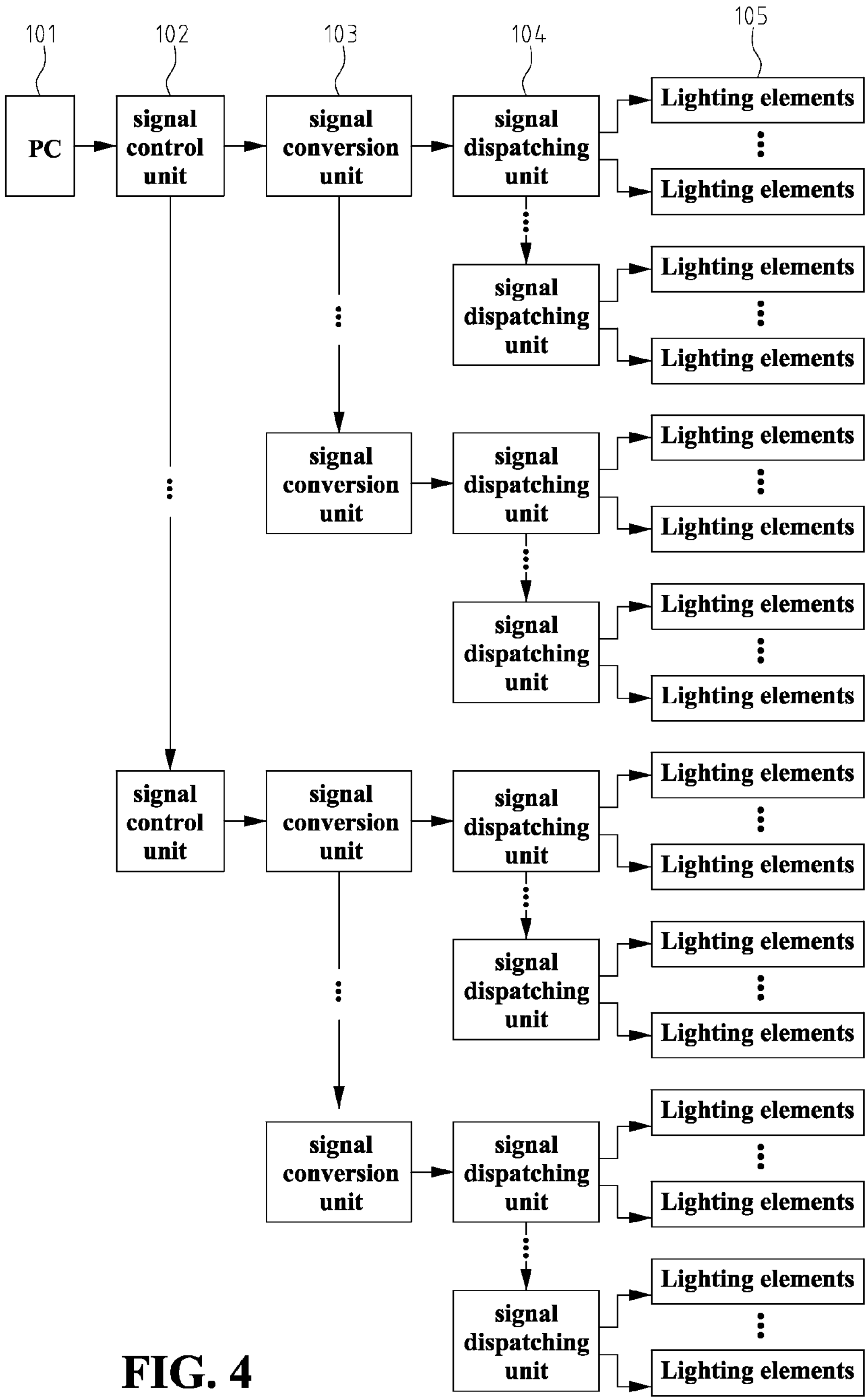
FIG. 4 shows another embodiment of the digital lighting control system of the present invention.

FIG. 4 shows another embodiment of the digital lighting control system of the present invention. This embodiment is an extension of the first embodiment of FIG. 1. In this embodiment, signal control unit 102 can relay signals to another signal control unit 102. Therefore, a plurality of signal control units 102 can be serially connected to PC 101. Similarly, signal conversion unit 103 can relay signals from signal control unit 102 to another signal conversion unit 103 so that a plurality of signal conversion units 103 can be serially connected to one signal control unit 102. Signal dispatching unit 104 can relay signals from signal conversion unit 103 to another signal dispatching unit 104 so that a plurality of signal dispatching units 104 can be serially connected to one signal conversion unit 103. In this manner, the digital lighting control system of the present invention can be extended to control a large area and various combinations of LED lighting elements.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A digital lighting control system for controlling a plurality of lighting elements, comprising:

a PC;

a signal control unit connected to said PC for receiving video signal input and interfacing with said PC;

a signal conversion unit connected to said signal control unit for converting received signals into addressing and control codes for said lighting elements; and a signal dispatching unit connected to said signal conversion unit for receiving and dispatching said addressing and control codes to said lighting elements;

wherein said signal conversion unit further comprises:

a signal converter for receiving signals from said signal control unit and converting said signals into a format suitable for digital lighting control;

an FPGA connected to said signal converter for receiving and processing said converted signals into said addressing and control codes for said lighting elements;

a microprocessor connected to said FPGA for providing human-machine interface, data transmission and display; and a tri-state output unit connected to said FPGA for receiving and relaying said addressing and control codes of said lighting elements to said signal dispatching unit.

2. The digital lighting control system as claimed in claim 1, wherein said signal converter is an RS-422/TTL converter.

3. The digital lighting control system as claimed in claim 1, wherein said microprocessor receives input information, including addresses, size, and RGB calibration factor of the lighting elements, to be used with signals received by said FPGA.

4. The digital lighting control system as claimed in claim 1, wherein said tri-state output unit comprises a plurality of 16-bit transceivers to receive a plurality of TTL signals.

5. A digital lighting control system for controlling a plurality of lighting elements, comprising:

a PC;

a signal control unit connected to said PC for receiving video signal input and interfacing with said PC;

a signal conversion unit connected to said signal control unit for converting received signals into addressing and control codes for said lighting elements; and a signal dispatching unit connected to said signal conversion unit for receiving and dispatching said addressing and control codes to said lighting elements;

wherein said signal dispatching unit further comprises:

a dispatcher connected to said signal conversion unit for receiving and dispatching said addressing and control codes of said lighting elements; and a plurality of LED drivers connected to said dispatcher for receiving said addressing and control codes from said dispatcher and driving said lighting elements to a specified luminance and brightness.

6. A digital lighting control system for controlling a plurality of lighting elements, comprising:

a PC;

a plurality of signal control units serially connected to said PC for receiving video signal input and interfacing with said PC;

a plurality of signal conversion units, each said signal control unit being serially connected to one or more of said signal conversion units for converting received signals into addressing and control codes for said lighting elements; and a plurality of signal dispatching units, each said signal conversion unit being serially connected to one or more of said signal dispatching units for receiving and dispatching said addressing and control codes to said lighting elements;

wherein each said signal conversion unit further comprises:

a signal converter for receiving signals from a corresponding said signal control unit and converting said signals into a format suitable for digital lighting control or relaying signals to another said signal converter;

an FPGA connected to a corresponding said signal converter for receiving and processing said converted signals into said addressing and control codes for said lighting elements;

a microprocessor connected to a corresponding said FPGA for providing human-machine interface, data transmission and display; and a tri-state output unit connected to a corresponding said FPGA for receiving and relaying said addressing and control codes of said lighting elements to a corresponding said signal dispatching unit.

7. The digital lighting control system as claimed in claim 6, wherein said signal converter is an RS-422/TTL converter.

8. The digital lighting control system as claimed in claim 6, wherein said microprocessor receives input information, including addresses, size, and RGB calibration factor of the lighting elements, to be used with signals received by said FPGA.

9. The digital lighting control system as claimed in claim 6, wherein said tri-state output unit comprises a plurality of 16-bit transceivers to receive a plurality of TTL signals.

10. A digital lighting control system for controlling a plurality of lighting elements, comprising:

a PC;

a plurality of signal control units serially connected to said PC for receiving video signal input and interfacing with said PC;

a plurality of signal conversion units, each said signal control unit being serially connected to one or more of said signal conversion units for converting received signals into addressing and control codes for said lighting elements; and a plurality of signal dispatching units, each said signal conversion unit being serially connected to one or more of said signal dispatching units for receiving and dispatching said addressing and control codes to said lighting elements;

wherein each said signal dispatching unit further comprises:

a dispatcher connected to a corresponding said signal conversion unit for receiving and dispatching said addressing and control codes of said lighting elements, or relaying said addressing and control codes to another said dispatcher; and a plurality of LED drivers connected to a corresponding said dispatcher for receiving said addressing and control codes from said dispatcher and driving said lighting elements to a specified luminance and brightness.

* * * * *